June 20, 1944.   H. E. SOMES   2,352,028
METHOD OF MAKING SCRAPER BLADES
Original Filed April 26, 1940
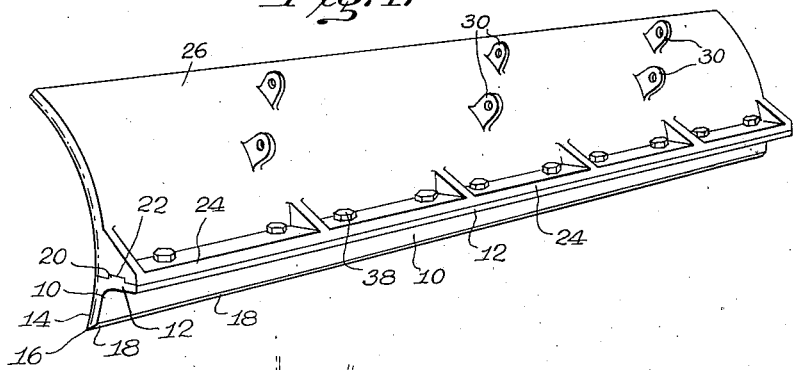
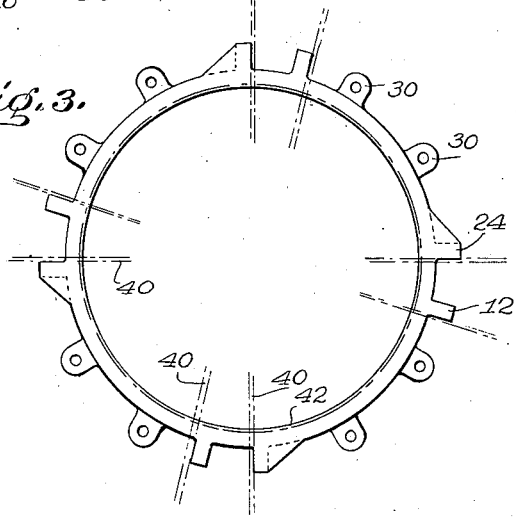
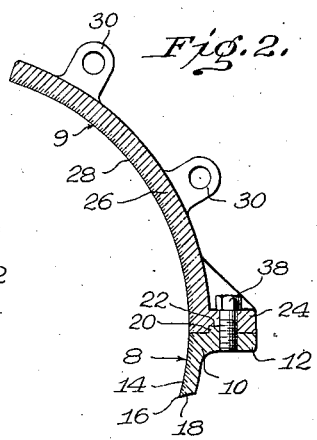
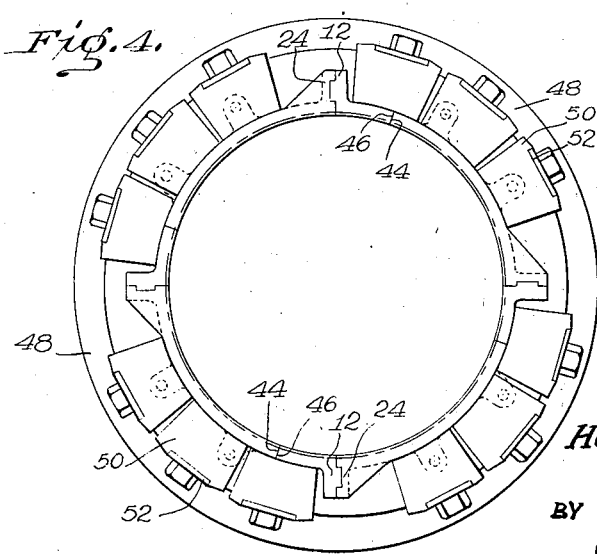
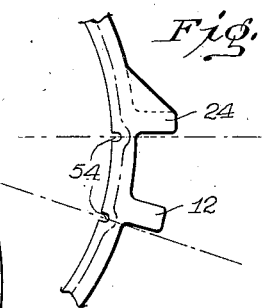
INVENTOR
Howard E. Somes
BY John P. Tarbry
ATTORNEY Patented June 20, 1944

2,352,028

UNITED STATES PATENT OFFICE 2,352,028

METHOD OF MAKING SCRAPER BLADES

Howard E. Somes, Detroit, Mich., assignor to Budd Induction Heating, Inc., Philadelphia, Pa., a corporation of Michigan Original application April 26, 1940, Serial No. 331,734. Divided and this application July 1, 1942, Serial No. 449,243

3 Claims. (Cl. 29—14)

This application is a division of my application Serial No. 331,734, filed April 26, 1940.

This invention relates to scraper blades and like structures of arcuate segmental form having hardened inside cutting surfaces, and particularly to a method of producing such structures economically.

Since such structures are generally thin walled segments which could be cut or separated from a tubular cylindrical stock piece, the present invention contemplates the separating of such scraper blades from a tubular arrangement or from tubular cylindrical stock as a final step in the process after heat treating and hardening. The hardening operation is preferably effected through the use of high frequency electromagnetic induction heating through the generation of annular heating currents and quenching by means of apparatus such as is disclosed in my Patent No 2,281,333, granted April 28, 1942, the tubular stock being fitted with suitable attaching members preferably prior to heat treatment and thereafter being separated into individual finished segments.

An object of the present invention is to provide an improved method of hardening segmental scraper blades internally, several at a time, the same being arranged in a continuous tube whereby electromagnetic induction hardening may be employed.

A further object is to provide a method of making a novel scraper blade of segmental form having an internal hardened surface zone and tough external unhardened rigid supporting structure.

These and other objects are accomplished by the present invention as will appear more fully from the following detailed description taken in conjunction with the accompanying drawing. It is expressly understood, however, that the drawing is employed for purposes of illustration only and is not designed as a definition or a limitation of the invention, reference being had for this purpose to the appended claims.

In the drawing wherein like reference characters indicate like parts,

Figure 1 illustrates a perspective view of a scraper blade including an adjacent mould board generally adapted for use in connection with highway maintenance equipment.

Figure 2 is a sectional view of such a scraper blade and mould board illustrating the cutting edge thereof.

Figure 3 is an end view of a tubular piece of stock from which such scraper blades may be formed and illustrating steps in the method of fabrication in accordance with the invention.

Figure 4 is illustrative of an alternative method; and

Figure 5 illustrates an alternative step adapted to the process of Figure 3.

Referring to Figures 1 and 2, the general structure of a scraper blade segment 8 and mould segment 9 is illustrated. The blade segment is generally a detachable segmental part such as 10 having a mould attaching flange 12 and a hardened abrasive resistant and cutting surface 14, the same terminating in a cutting edge 16 provided with suitable clearance 18 immediately therebehind. The attaching flange 12 is preferably provided with a longitudinally extending ridge 20 adapted to fit into a corresponding channel 22 in a mating flange 24 secured to the segmental mould board 26. The mould board may have an internal hardened surface 28 adapted to resist abrasion and on the exterior thereof be provided with a plurality of attaching lugs such as 30.

It has heretofore been the practice to provide such scraper blades with a hardened cutting edge, the edge and the adjacent metal, and, in fact, substantially the entire blade segment being hardened. Such a blade either is likely not to have a sufficiently hard cutting edge or the entire blade being sufficiently hard to provide a proper hard cutting edge is likely to be too hard to resist fracture in the severe usage to which the same is subjected. The scraper blade of the present invention is formed of tough metal adapted to resist severe strains without fracture and is provided on its inner surface only with a hardened zone, the degree of hardness of the hardened zone being sufficient to afford in conjunction with the tough remaining back metal of the blade a cutting edge well adapted to resist the most severe usage to which such blades are subjected.

In order to form such an internal hardened layer, high frequency high power electromagnetic induction differential heat treatment is employed and in order that the differential induction heating may be sufficiently accomplished, a tube from which the segmental blades may be subsequently cut is employed as stock material. Such tubular stock will have the desired toughness prerequisite to a finished scraper blade structure and may be blocked off into portions which will subsequently be cut into such blade or board segments. Prior to differentially heat treating the internal surface layers thereof, however, suitable lugs such as 30 may be welded to the exterior of the tube in the proper places and suitable attaching flanges such as 24 and 12 will likewise be welded to the exterior of the tube. As is illustrated in Figure 3, lugs and flanges may be secured to a tube in the proper relation so that finally the tube may be cut into four mould board segments and four scraper blade segments at the points 40.

After securing the attaching lugs and flanges to the exterior of the tubular stock, the same may be stress relieved so as to remove any stresses set up by the welding of the lugs thereto and thereafter the internal surface of the tube is subjected to differential induction heat treatment and quenching, the operation being similar to that disclosed in the aforementioned copending application. The electric heating of the internal surface zone 42 and subsequent quenching is effected in a cycle involving but a few seconds and the heating is preferably effected progressively along the length of the axis of the tubular stock at a constant rate. The heating is effected so rapidly and the quenching takes place so quickly thereafter that only the internal surface zone is heated and quenched and, therefore, hardened and the remaining metal remains substantially unaffected during the treatment.

Thus upon severing the tubular stock at the points indicated at 40 by grinding with a water cooled abrasive rubber wheel, for example, or other suitable grinding device through the hardened layer, and cutting the back metal, the pieces may be subsequently machined in any desired manner; for example, the ridge 20 and corresponding channel 22 upon the flanges 12 and 24 may be machined and the cutting edge 16 sharpened and provided with a proper clearance 18 therebehind. These machining operations would be difficult to perform after the hardening were it not for the fact that the hardening is restricted to the zone as indicated and because of the restricted hardened zone, it will readily appear that the blade is more easily sharpened because of the limited extent of hardened metal. Because of the fact that the back metal is tough and not brittle as would be the case were the entire blade hardened, the blade is less liable to fracture, which fractures render resharpening extremely costly and difficult. Such grinding operations as would be required if the entire blade were hardened would be liable to cause drawing of the hardness because of the heat generated whereas in the structure herein disclosed the grinding operation is restricted to a narrow zone and the heat generated would, therefore, be considerably less and the danger of drawing substantially eliminated.

It is to be noted that in order to assemble a blade section 8 and mold board section 9, assuming that the relative positions have not been changed from that shown in Figure 3 after severance, it is necessary to reverse one section relative to the other, that is, substantially in its plane, to bring the flanges 18 and 24 in abutting relation with the arcuate faces of the sections forming continuations of each other.

If it is desired, the various parts may be machined prior to the heat treatment and the same assembled into a tubular arrangement, as illustrated in Figure 4. In such a case, the mating flanges 12 and 24 would best be copper plated and bolted together for good electrical contact and where the edges 44 and 46 of the blade and board meet, the same should likewise be machined for a substantially perfect fit and the surfaces copper plated in order to assure good electrical conductivity. Because of the low melting point of copper, it may be desirable to employ an alloy thereof or a metal having a higher melting point such as silver, but in any event, it should be a good conductor and capable of forming a good electrical contact or bond over substantially the entire contacting area.

The parts may be held in tubular relation to one another through the use of one or more pot chucks, one form of which is shown in Figure 4. Such a pot chuck is adapted to grip the entire periphery of the tubularly arranged parts and to hold the same tightly in engagement with one another. Because of the fact that during heat treatment the thermal stresses expand and contract the members undergoing heat treatment, the chuck should preferably be one in which the chucking members are resiliently or yieldably urged into engagement with the tubular members. For example, in the chuck 48 shown the chucking members 50 are supported upon stiff leaf springs 52 and urged radially inwardly against the tube thereby. Because of the flanges 12 and 24, the chucking members which would otherwise be positioned at these points may be omitted. Such omission, however, obviously is not serious in the present case since the flanged portions are secured together by the bolts 38 used in the finished structure. One or more chucks of similar construction may be required at spaced points along the length as may be found desirable since it is essential that the segmental parts of the tube which are to be heat treated should be in continuous tight engagement with one another so that no serious contact resistance to the flow of current will exist between the adjacent parts.

While in the modification of Figure 3 it has been suggested that the various segments be cut from the finished tube through grinding and cutting operations, it may be desirable to so shape the tubular member as to facilitate the subsequent separation of the desired segmental parts therefrom. For example, in Figure 5 there is illustrated the tubular structure of Figure 3 provided with longitudinal internal grooves 54, which grooves in practice would cause the skin heating currents to flow radially outward around the groove thereby causing wider distribution of the current because of the current's being further from the inducing coil and less heating effect. If the heating effect is insufficient at the point to bring the material to the hardening temperature, the tube may be more readily cut at these points after the remainder of the internal surface of the tube has been hardened. On the other hand, if the heating currents are sufficient, the hardened layer adjacent the longitudinal grooves 54 will be forced radially outward away from the internal surface and if the groove is deep enough, cause the piece at the particular point to harden all the way through. The piece may subsequently be fractured because of the hardness at this point without resorting to cutting or grinding.

Because of the adaptability of the electromagnetic induction heat treatment to castings, in practice the various parts may be cast with the lugs and flanges as an integral part thereof from a copper silicon steel casting or other cast alloy and subsequently hardened by the procedure outlined.

It will thus appear that the present invention provides a novel method of producing scraper blades and similar arcuate objects in which an internal hardened layer or zone is desirable and because of the rapidity with which the hardening can be effected by the electromagnetic induction process and because of the fact that the unhardened portion may be readily machined, rapid production at low relative cost may be effected.

Although the invention has been illustrated and described in connection with several modifications, it is to be understood that the invention is not limited thereto but may be embodied and practiced in various modified forms. As many changes in construction, arrangement and procedure may be made without departing from the spirit of the invention as will be apparent to those skilled in the art, reference will be had to the appended claims for a definition of the limits of the invention.

What is claimed is:

1. The method of simultaneously making a plurality of moldboards and blades for road scrapers, comprising providing a unitary tubular workpiece of hardenable material, forming lines of demarcation along the inner face of said workpiece to divide said workpiece into separate moldboard and blade forming sections, providing the outer face of each section with an attaching flange extending outwardly therefrom along a line of demarcation, heat treating the inner surface of said tubular workpiece to raise the inner surface only to a hardening temperature and then quenching the same while the surrounding material is below hardening temperature to provide a hardened inner surface layer surrounded by a layer of relatively unhardened material, then cutting said workpiece along said lines of demarcation between said different sections to form curved moldboard sections each having an attaching flange extending along one cut edge, and to also form curved scraper blade sections each having an attaching flange extending along one cut edge, and then forming a scraper edge along the other cut edge of each blade section whereby said blades can be detachably secured to said moldboards to form a road scraper.

2. The method of simultaneously making a plurality of moldboards and blades for road scrapers, comprising providing a unitary tubular workpiece of hardenable material, forming lines of demarcation along the inner face of said workpiece to divide said workpiece into separate moldboard and blade forming sections, providing the outer face of each section with an attaching flange extending outwardly therefrom along a line of demarcation, heat treating the inner surface of said tubular workpiece to raise the inner surface only to a hardening temperature and then quenching the same while the surrounding material is below hardening temperature to provide a hardened inner surface layer surrounded by a layer of relatively unhardened material, whereby said flanges are left unhardened, then cutting said workpiece along said lines of demarcation between said different sections to form curved moldboard sections each having an attaching flange extending along one cut edge, and to also form curved scraper blade sections each having an attaching flange extending along one cut edge, and then forming a scraper edge along the other cut edge of each blade section, and then machining said unhardened flanges to form interfitting faces on the respective moldboard and scraper blade sections, whereby said blades can be detachably secured to said moldboards to form a road scraper.

3. The method of simultaneously making a plurality of mold board and scraper blade sections for earth scrapers, which consists in providing a tubular workpiece of hardenable metal with a plurality of equispaced integral mold board section flange portions extending radially outwardly from the external surface thereof and with a corresponding number of equispaced integral blade section flange portions, each being intermediate a pair of mold board section flange portions, heating the interior surface only of said workpiece to predetermined depth to hardening temperature and quenching the heated surface to harden the same while the surrounding metal is below hardening temperature, longitudinally severing the workpiece along radial planes, each adjacent one side face only of each flange portion to provide a plurality of arcuate mold board sections, each with a longitudinal flange portion along one edge, and a corresponding number of arcuate blade sections, each with a flange portion along one edge, forming a cutting edge along the opposite longitudinal edge of each blade section, reversing one of a blade section and a mold board section end-for-end relative to the other with the flange portions thereof in abutting relation and the hardened surface of one section forming a continuation of the hardened surface of the other section and securing the blade section and mold board section together through the longitudinal flange portions thereof.

HOWARD E. SOMES.